United States Patent [19]
Roos

[11] 3,734,457
[45] May 22, 1973

[54] PRESSURE BIASED BUTTERFLY VALVE SEAL

[75] Inventor: William N. Roos, St. Cloud, Minn.
[73] Assignee: DeZurik Corporation, Sartell, Minn.
[22] Filed: Feb. 22, 1972
[21] Appl. No.: 228,204

Related U.S. Application Data

[63] Continuation-in-part of Ser. No. 104,280, Jan. 6, 1971, abandoned.

[52] U.S. Cl. .................251/173, 251/174, 251/306, 251/368
[51] Int. Cl. .............................................F16k 1/228
[58] Field of Search.................251/173, 174, 305, 251/306, 307, 315, 316, 368

[56] References Cited

UNITED STATES PATENTS

| | | | |
|---|---|---|---|
| 1,977,351 | 10/1934 | Phillips | 251/306 |
| 3,027,133 | 3/1962 | Anderson | 251/173 |
| 3,048,363 | 8/1962 | Garrigan | 251/307 |
| 3,168,279 | 2/1965 | Anderson et al. | 251/315 X |
| 3,260,496 | 7/1966 | Borcherdt | 251/173 X |
| 3,497,178 | 2/1970 | Priese | 251/174 |
| 3,650,508 | 3/1972 | Kosmala et al. | 251/174 |

Primary Examiner—William R. Cline
Attorney—C. Frederick Leydig, Richard L. Voit, Edward W. Osann, Jr. et al.

[57] ABSTRACT

A resilient seal ring is located in a stepped, annular groove in a valve body with a portion of the ring extending radially inwardly into the flow passageway and a peripheral web of the ring extending radially outwardly into the deeper portion of the groove. One or more metal hoops encircle axially extending shoulders on the ring to take up the primary hoop stresses imparted to the ring by the valve closure member. In the preferred embodiment the ring is made of a fluorinated hydrocarbon polymer and an annular spring engages one side of the web portion of the ring to provide a secondary seal with the groove. Pressure entering the groove urges the spring and the web portion axially into more positive engagement with one another and urges the ring radially into more positive engagement with the closure member.

17 Claims, 8 Drawing Figures

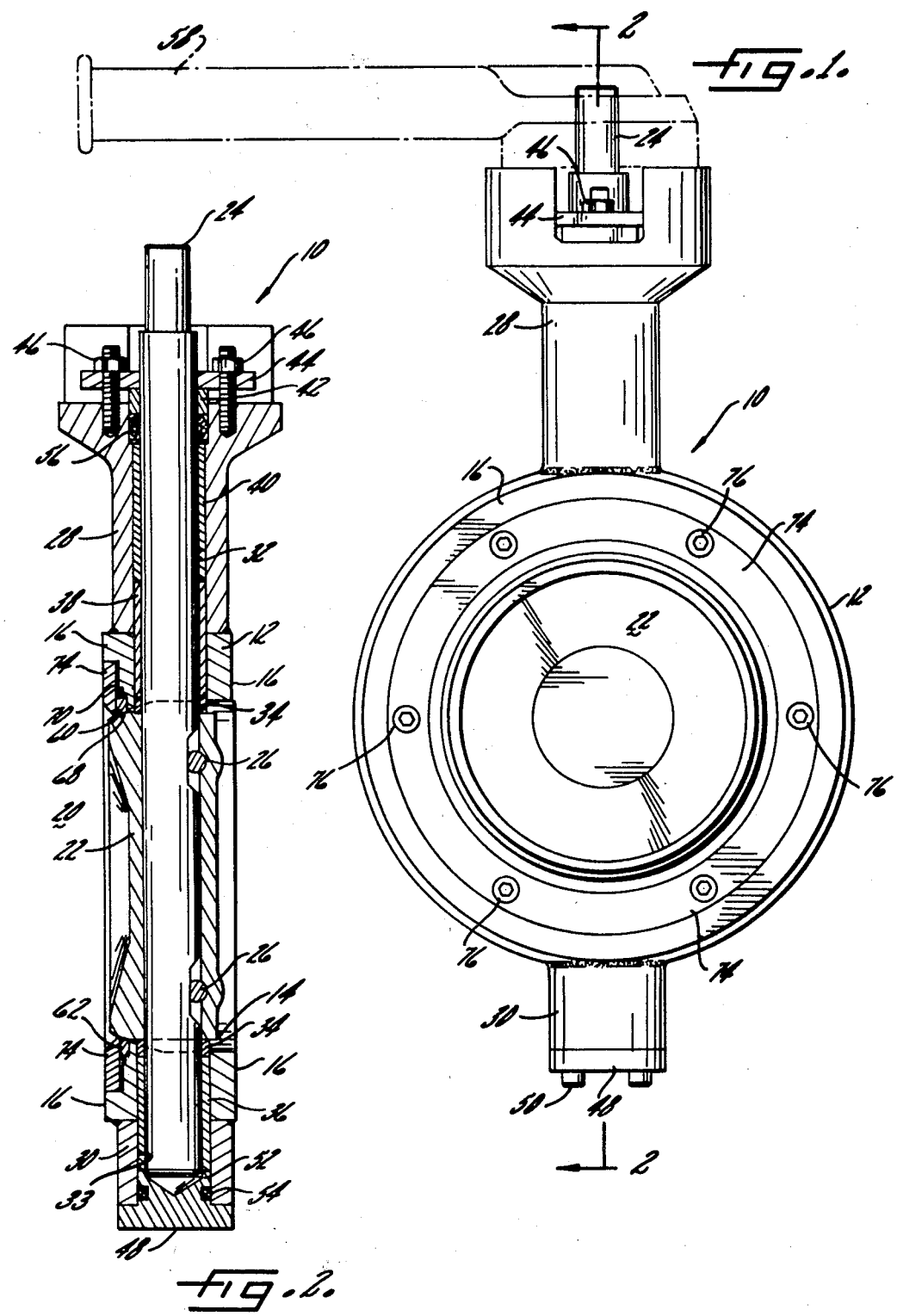

PRESSURE BIASED BUTTERFLY VALVE SEAL

CROSS REFERENCE TO RELATED APPLICATION

This application is a continuation-in-part of my copending application Ser. No. 104,280, filed Jan. 6, 1971, now abandoned, and entitled "Valve Seal."

BACKGROUND OF THE INVENTION

The present invention relates generally to valves and more particularly concerns a high pressure, high temperature seal for a valve, such as a butterfly valve, having a pivotally mounted closure member.

In order to provide a positive, bubble-tight seal between a valve body and its pivoted closure member it is conventional to employ a resilient seal ring such as synthetic rubber or the like which is inert with respect to the process fluids with which the valve is intended to be used. While such seal rings have been generally satisfactory for moderate temperature and pressure conditions, for example up to 250° F. and 300 psi, they frequently fail when used above these conditions.

More recently, a number of fluorinated hydrocarbon polymers, for example "Teflon" sold by DuPont, have been developed which are not only inert to a greater number of process fluids but which also are able to withstand higher temperature and pressure conditions than synthetic rubber materials. However, while these fluorinated hydrocarbon polymers have a very low coefficient of friction and are generally regarded as resilient, they are relatively slow in recovering from deformations and, when subjected to prolonged stresses, tend to "cold-flow," i.e., take a permanent set or change in shape or dimensions. In the past, this tendency of "Teflon" to gradually cold-flow under moderate temperature and pressure conditions has caused seal rings made of this material to creep or recede away from the cooperating seal elements which produce the deformation necessary to establish an effective seal. As a result seal rings made of "Teflon" material, in time, become less and less effective when subjected to prolonged or repeated physical and temperature stresses although these stresses are well below the established elastic and thermal limits of the material.

Accordingly, it is the primary aim of the present invention to provide an improved seal construction for high pressure-high temperature valves in which the stress-strain relationship imposed on a resilient seal member made of a fluorinated hydrocarbon polymer is such that the tendency of the resilient seal member to cold-flow is minimized.

A more specific object of the invention is to provide an improved valve seal construction in which undue enlargement of a resilient fluorinated hydrocarbon seal member is prevented by one or more metal hoops which encircle the seal member.

A further object of the invention is to provide such an improved valve seal which provides a non-interfering lead-in of the closure member to the seal member to provide tight sealing engagement between the sealing surfaces and long-wearing characteristics.

Another object of the invention is to provide an improved valve seal of the above type having a primary sealing surface engageable with the peripheral sealing surface of the valve closure member and a secondary sealing portion engageable with an annular spring element located in the valve body such that the seal between the resilient element and both the closure member and the spring element become more positive with increasing pressure upstream of the valve closure member.

It is a related object of the invention to provide an improved valve seal of the foregoing character in which the primary sealing forces are mechanical in nature and the augmented radial fluid pressure forces are substantially balanced whereby the force necessary to open the valve remains substantially constant.

It is also an object of the invention to provide an improved valve seal as described above which is substantially self-centering relative to the valve closure member and which is designed to substantially eliminate seal blow-out even when the valve is suddenly opened under high pressure conditions.

These and other objects and advantages of the invention will become more readily apparent upon reading the following detailed description and upon reference to the accompanying drawings.

BRIEF DESCRIPTION OF THE DRAWINGS

FIG. 1 is a front elevation of a butterfly valve embodying the improved seal of the present invention;

FIG. 2 is a section taken along line 2—2 in FIG. 1;

DESCRIPTION OF THE PREFERRED EMBODIMENT

Figure 3:
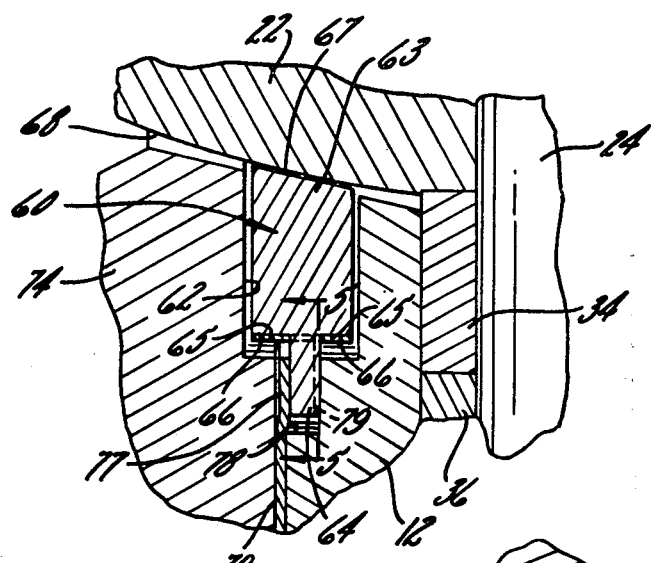
FIG. 3 is an enlarged fragmentary cross-section of one embodiment of the improved seal as installed in the valve.

While the present invention is susceptible of various modifications and alternative forms, only three illustrative embodiments have been shown by way of example in the drawings and will herein be described in detail. It should be understood, however, that it is not intended to limit the invention to the particular forms disclosed; but, on the contrary, the intention is to cover all modifications, equivalents and alternatives falling within the spirit and scope of the invention.

Turning now to the drawings, and particularly FIGS. 1 and 2, a butterfly valve 10 is illustrated having a valve body 12 with an axial flow passageway 14 therein. The body 12 has flat annular surfaces 16 which are adapted to enable the placement and bolting of the valve 10 between the flanges of two in-line conduits or pipes in a fluid system. As will be more fully described hereinafter, the valve 10 is bi-directional in that it will function properly regardless of the direction of fluid flow through the passageway 14. To block and unblock the passageway 14, a generally disc-shaped closure member 22 is mounted on a rotatable operating shaft 24 by bolts 26 or the like.

Secured to upper and lower portions of the valve body 12 are a neck 28 and lower extension 30 which are shown as being welded to the valve body, although other methods of attachment may be used. The rotatable shaft 24 is journalled in openings 32 and 33 extending through the neck 28 and the lower extension 30 by axial bushings 34, radial bushings 36 and 38, and a spacer 40 positioned within the openings 32 and 33.

To prohibit axial movement of the shaft 24, the neck 28 flairs outwardly and upwardly and has a gland follower 42 cooperating with a retainer ring 44 which is suitably bolted to the neck by bolts 46 or the like. To enable access to the shaft for repair or replacement, the extension 30 has an end cap 48 removably attached by bolts 50 or the like. The end cap also has a closely fitting inward core portion 52 having an annular groove for receiving a sealing annular O ring 54 for preventing leakage. Similarly, an annular V packing seal 56 is provided to prevent leakage from the passageway 14 through the neck 28. The V packing seal as well as the O ring are preferably made of a fluorinated hydrocarbon polymer comprised of polymerized tetrafluorolethylene, although any suitable rubber-like material may be used. To rotate the shaft and therefore pivot the closure member 22, an operating handle 58 is attached to the portion of the shaft 24 extending beyond the end of the neck 28.

In accordance with the present invention, a resilient sealing ring, indicated generally at 60, is disposed in an annular groove 62 in the valve body to provide a seal between the valve body and the closure member 22 when the closure member is positioned to block the passageway 14. As shown in FIG. 3, the resilient sealing ring 60 is formed with a main body portion 63 and a radially outwardly extending circumferential web portion 64. The body 63 of the sealing ring 60 projects radially inwardly from a relatively wide portion of the groove 62 into the passageway 14 and the circumferential web 64 is slidably received in a narrower, radially outer portion of the groove.

Pursuant to the invention, the resilient sealing ring 60 is surrounded by a pair of metal hoops 65. In the embodiment shown in FIG. 3, the hoops 65 are located on and engage respective axially extending shoulders 66 adjacent each side of the web 64. The hoops 65 and the sealing ring 60 are dimensioned relative to each other and relative to the closure member so as to be circumferentially stretched when the primary sealing surface 67 of the sealing ring is substantially completely engaged by the peripheral sealing surface 68 of the closure member 22. Moreover, the dimensioning of the hoops and the sealing ring is such that the hoops return the sealing ring to a substantially unstretched condition when the primary sealing surface 67 is not substantially completely engaged by the peripheral sealing surface of the closure member. Preferably, the hoops 65 are dimensioned to maintain the sealing ring in light hoop compression when the primary sealing surface 67 is not engaged by the peripheral sealing surface 68 of the closure member 22.

In further accordance with the invention, the sealing ring is preferably made of fluorinated hydrocarbon polymer principally comprised of polymerized tetrafluoroethylene, such as Teflon manufactured by DuPont. Such material is substantially unaffected by a wide range of chemicals and process fluids and is thermally stable at temperatures up to 500°F. It is also resilient and has a very low coefficient of friction.

By surrounding the resilient sealing ring 60 with the metal hoops 65, dimensioned as noted above, the tendency of the sealing ring material to "cold-flow" is substantially eliminated. This is due to the fact that the stress-strain levels of the sealing ring material are kept very low, ranging from light hoop compression imposed by the hoops 65 when the valve is open to light hoop tension when the valve is closed. Since the principal stresses are imposed upon and absorbed by the metal hoops 65, the total deformation and combined stresses of the sealing ring 60 are kept at a low level.

It is another aspect of the present invention that the sealing ring 60 and the hoops 65 are dimensioned to have moving clearance in the radially inner portion of the groove 62 and the circumferential web 64 is slidably received in the radially outer portion of the groove. This insures that the sealing ring and hoops are substantially self-centering with respect to the closure member 22. Also by providing such clearance between the body 63 of the sealing ring 60 and the groove 62 system pressure is introduced into the groove from the high pressure side of the closure member 22 (for example from the left side in FIG. 3) and this pressure exerts a force between the base of the radially inner groove portion and the (left-hand) hoop 65 to urge the resilient seal ring 60 radially inward into more firm engagement with the closure member 22. Desirably, the radial inward force exerted by the pressure in the groove is substantially equal to or slightly in excess of the force exerted by the pressure fluid between the sealing surfaces 67 and 68.

As a further important feature of the invention, the major central section of the peripheral sealing surface 68, in axial cross-section, is in the form of a circular sector, with the marginal edges thereof formed with progressively decreasing radii to serve as a non-interfering lead-in to the primary sealing surface 67 of the sealing ring 60 which is formed substantially tangent to the circular sector of the closure member. This configuration not only insures tight sealing engagement between the sealing surfaces 67 and 68, but also enhances their long-wearing characteristics.

Figure 4:
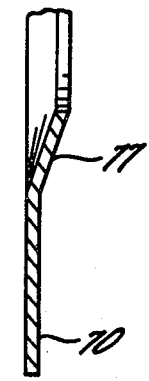
FIG. 4 is an enlarged fragmentary cross-section of an axial biasing spring for the valve seal.

Pursuant to another feature of the invention, provision is made for effecting a positive secondary seal between the seal ring 60 and the valve body 12. As shown in FIGS. 2 and 3, an annular spring means 70 is disposed in the radially outer portion of the groove 62 between one side wall thereof and one face of the circumferential web 64. In the illustrated embodiment, the groove 62 is formed in part in the valve body 12 and in part in a valve seal retaining ring 74 which is secured to the body by bolts or cap screws 76. Prior to tightening the bolts 76, the annular spring 70 is sandwiched between the retaining ring 74 and the valve body 12 so as to engage the web 64 of the seal ring 60. As shown in FIG. 4, the annular spring 70 in its unstressed condition, is formed with a radially inner portion 77 which is inclined slightly axially relative to the body of the spring. When the bolts 76 are tightened, the inner portion 77 of the spring is pressed against the web 64 and the portion 77 is substantially straightened out relative to the body of the spring 70. Because of the low coefficient of friction of the seal ring material, the axial force exerted by the spring 70 on the web 64 does not interfere with the self-centering action of the seal ring 60.

In the embodiment shown in FIG. 3, it will also be understood that when system pressure is introduced into the groove 62 from the high pressure side of the closure member this pressure also urges the circumferential web 64 and the annular spring 70 axially into more firm engagement with one another. This enhances the secondary seal formed between the sealing ring 60 and the valve body 12 when relatively high system pressures are encountered. In other words, the higher the system pressure, the more tightly the spring 70 and the web 64 are pressed against one another.

It will be understood that when the high pressure is on the left, as seen in FIG. 3, the system pressure enters the small V-shaped space between the seal ring retainer 74 and the inclined portion 77 of the spring 70 to force the inner portion 77 of the spring axially to the right more tightly against the web 64. Preferably, the inner face of the retaining ring 74 is coated with a sealing substance, such as spray Teflon, to insure a fluid tight seal between the retaining ring 74 and the outer portion of the annular spring 70. Conversely, when the high pressure is on the right, as seen in FIG. 3, the system pressure enters the radial space between the valve body 12 and the web 64 and forces the web to the left more tightly against the inner portion 77 of the spring 70.

Figure 5:
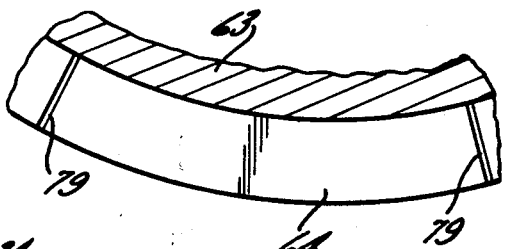
FIG. 5 is an enlarged fragmentary section taken along line 5—5 in FIG. 3.

In keeping with a further aspect of the present invention, means are provided for communicating system pressure to and from the radially outermost portion of the groove 62. This is particularly desirable for permitting the escape of system pressure from the space 78 between the outer periphery of the web 64 and the base of the outermost portion of the groove 62 as the closure member 22 is rotated to unblock the passageway 14. Otherwise, if this system pressure is trapped in the space 78, it exerts a substantial force against the web 64 tending to expel the sealing ring 60 out of the groove 62 as the closure member 22 is opened. To this end, the face of the web 64 on the opposite side from the spring 70 is provided with channel means for communicating system pressure to and from the space 78 at the radially outermost portion of the groove 62. As shown in FIGS. 3 and 5, the channel means includes a plurality of symmetrically located grooves 79 formed in the face of the web 64.

Figure 6:
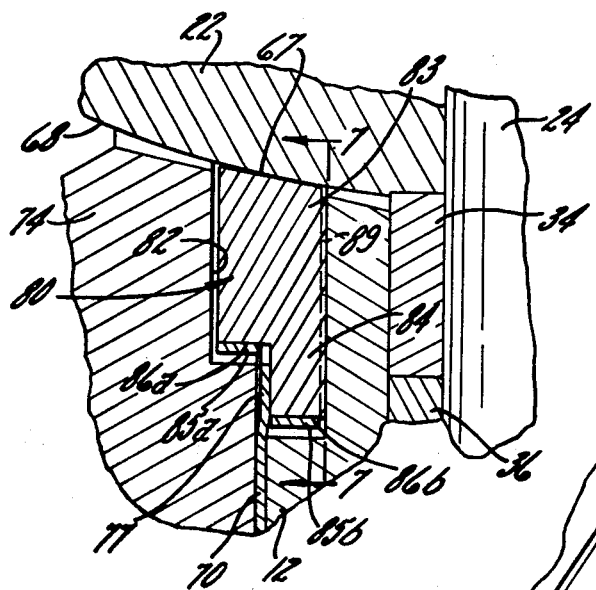
FIGS. 6 and 7 are enlarged fragmentary views similar to FIGS. 3 and 5 of another embodiment of the improved seal.
Figure 7:
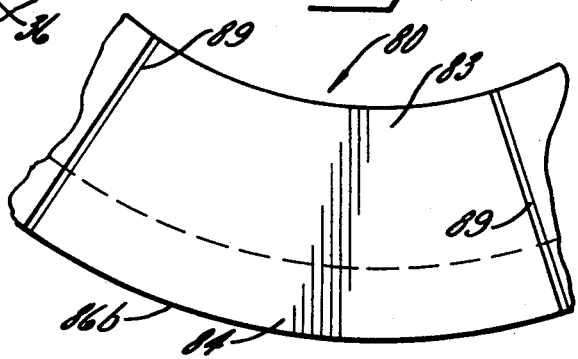

Turning now to FIGS. 6 and 7, there is shown another embodiment of the valve seal of the present invention. As shown here, the resilient seal ring 80 is formed with an annular seal body 83 and a circumferential web 84 located in an annular groove 82 in the valve body 12. In this embodiment, however, one metal hoop 85a is located on an axially extending shoulder 86a adjacent the web 84 and another hoop 85b is located on an axially extending shoulder 86b on the outer periphery of the web 84. With this arrangement, it will be seen that substantially the entire cross-sectional area of the resilient seal ring is confined within the hoops 85a and 85b. It will be noted, however, that the hoops 85a and 85b are each slightly narrower than their respective shoulders 86a and 86b in order to insure adequate moving clearance within their respective radially inward and outward portions of the groove 82.

As in the case of the previous embodiment, the embodiment shown in FIGS. 6 and 7 also contemplates the introduction of system pressure into the groove 82 from the high pressure side of the closure member 22 and the utilization of this system pressure to enhance engagement of both the primary and secondary sealing surfaces of the seal ring 80. When the left-hand side of the closure member 22 is the high pressure side, the pressure enters the groove 82 and exerts a radial force between the base of the groove and the hoop 85a. On the other hand, when the right-hand side of the closure member is the high pressure side, the pressure enters the groove 82 through a series of channels 89 formed in the side of the web 84 (see FIG. 7) and exerts a radial force between the bottom of the groove and the hoop 85b. It will also be understood that system pressure admitted into the groove 82 from either side of the closure member 22 also increases the axial sealing engagement between the web 84 and the inner portion 77 of the annular spring element 70.

Figure 8:
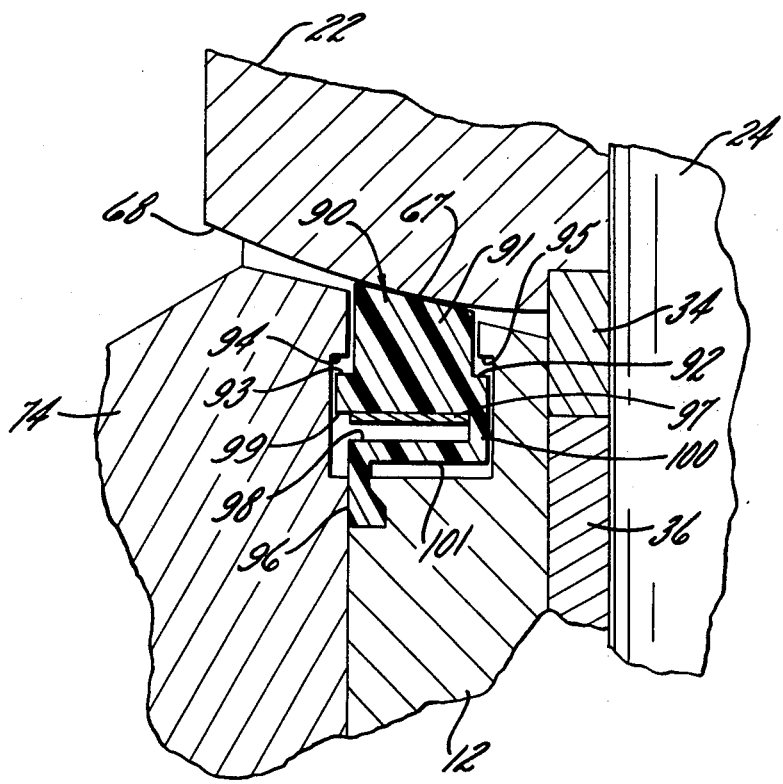
FIG. 8 is an enlarged fragmentary section similar to FIG. 3 of still another embodiment of the improved seal.

In FIG. 8, there is shown still another embodiment of the valve seal of the present invention. In this arrangement, the resilient seal ring 90 is formed with an annular seal body 91 having a pair of retaining shoulders 92 and 93 on opposite sides thereof for ensuring retention of the seal ring within the valve body 12. More particularly, the shoulders 92 and 93 overlap a pair of opposed shoulders 94 and 95 formed on the corresponding walls of the retaining ring 74 and the valve body 12, respectively, with the two cooperating pairs of shoulders 92, 94 and 93, 95 being radially spaced from each other. The primary retaining means for the seal ring 90 is a circumferential web 96 formed on the radially outer periphery of the ring 90 and fitted within a complementally formed groove in the valve body 12, with the outer portion of the web 96 being wider in the axial direction than the inner portion to hold the ring 90 firmly in place. However, in the event of a failure of the primary retaining means, the retaining shoulders 92 and 93 on the sealing ring abut the corresponding opposed shoulders 94 and 95 to hold the sealing ring in place.

The embodiment of FIG. 8 utilizes only a single metal hoop 97, which is received in an elongated axial slot 98 extending continuously around the circumference of the sealing ring 90 to form a relatively long axial shoulder 99 on which the hoop 97 is mounted. The hoop 97 has the same axial dimension as the sealing surface 67 of the ring 90 and is axially aligned therewith so that the entire width of the sealing surface is confined within the hoop 97; and yet the body 91 of the seal ring is firmly attached to the retaining web 96 by means of a radial web 100, having the same axial dimension as the retaining shoulder 92, and an axial web 101. To permit free radial movement of the seal ring 90, it is dimensioned to be slightly smaller in the axial direction than the groove formed by the retaining ring 74 and the valve body 12. Since there is no need for the spring element 70 in the embodiment of FIG. 8, both sides of the seal ring 90 are spaced slightly away from the radial walls of the groove.

The clearances on opposite sides of the ring 90 not only permit free radial movement of the ring, but also ensure that substantial areas on the outer portion of the ring 90 are exposed to the pressures on opposite sides of the closure member 22. Thus, pressure from the left-hand side of the member 22 as viewed in FIG. 8 is applied to the entire outer surface of the hoop 97 and the ring surface on which the hoop is mounted, while pressure from the right-hand side is applied to the shoulder formed by the radially outer surface of the web 101. Accordingly, regardless of which side of the closure member 22 is the high pressure side, the high pressure is utilized to exert a substantial inward radial force on the seal ring 90.

I claim as my invention:

1. A valve seal comprising, in combination,
    a valve body defining an axial flow passageway,
    a closure member pivotally mounted in the valve body to selectively block and unblock the passageway, said closure member having a peripheral sealing surface, annular groove means in the valve body communicating with the passageway and disposed in radial alignment with the peripheral sealing surface of the closure member when it is positioned to block the passageway, said groove means having a radially inner portion substantially wider than the radially outer portion thereof, a resilient sealing ring disposed in said groove means and projecting radially inwardly therefrom into the passageway with a primary sealing surface formed on the inner periphery thereof engageable by the peripheral sealing surface of the closure member when it is positioned to block the passageway, said sealing ring forming axially extending shoulder means and a circumferential web extending substantially radially outwardly from said axially extending shoulder means and into the radially outer portion of said groove means, said peripheral sealing surface of said closure member being in the form of a circular sector in axial cross-section with the radius of said sector decreasing from the axial center of said sealing surface to the edges thereof so as to provide a non-interfering lead-in to said primary sealing surface on the inner periphery of said sealing ring, and metal hoop means located on and engaging at least a portion of said shoulder means, said hoop means and sealing ring being dimensioned relative to each other and relative to the closure member so as to be circumferentially stretched when the primary sealing surface of the sealing ring is substantially completely engaged by the peripheral sealing surface of the closure member and such that said hoop means returns said sealing ring to a substantially unstretched condition when the primary sealing surface thereof is not substantially completely engaged by the peripheral sealing surface of the closure member.

2. A valve seal as defined in claim 1 wherein said hoop means is dimensioned to normally maintain said sealing ring in light hoop compression when the primary sealing surface thereof is not substantially completely engaged by the peripheral sealing surface of the closure member.

3. A valve seal as defined in claim 1 wherein said sealing ring is made of a fluorinated hydrocarbon polymer principally comprised of polymerized tetrafluoroethylene.

4. A valve seal as defined in claim 1 wherein said hoop means includes a pair of metal hoops each located on and engaging respective axially extending shoulder means formed on the outer periphery of said sealing ring.

5. A valve seal as defined in claim 4 wherein said circumferential web extends substantially radially outwardly from between said axially extending shoulder means.

6. A valve seal as defined in claim 4 wherein one of said axially extending shoulder means is formed on the outer periphery of said circumferential web.

7. A valve seal as defined in claim 1 wherein said hoop means and said sealing ring are dimensioned to have moving clearance in the radially inner portion of said groove means and said circumferential web is slidably received in the radially outer portion of said groove means whereby said sealing ring and hoop means are substantially self-centering with respect to said closure member.

8. A valve seal as defined in claim 1 wherein said resilient seal ring is formed relative to said groove means such that system pressure is introduced into said groove means from the high pressure side of said closure member and said pressure exerts a force between said hoop means and said groove means to urge said resilient seal ring radially inwardly into more firm engagement with said closure member when it is positioned to block said passageway.

9. A valve seal as defined in claim 1 wherein an annular spring means is disposed in the radially outer portion of said groove means between one side wall thereof and one face of said web for biasing said web axially against the other side wall of said groove means.

10. A valve seal as defined in claim 9 wherein said resilient seal ring is formed relative to said groove means such that system pressure is introduced into said groove means from the high pressure side of said closure member and said pressure urges said circumferential web and said annular spring means axially into more firm engagement with one another when said closure member is positioned to block said passageway.

11. A valve seal as defined in claim 9 wherein said annular spring means includes an outer circumferential portion substantially radially disposed and an inner circumferential portion inwardly inclined from the radial toward said one face of said web.

12. A valve seal as defined in claim 9 wherein the other face of said web is provided with channel means for communicating system pressure to and from the radially outermost portion of said groove means.

13. A valve seat as defined in claim 1 wherein said sealing ring forms at least one axially extending retaining shoulder on the side thereof, and said groove means includes a corresponding shoulder overlapping the retaining shoulder on the sealing ring on the radially inward side thereof so as to block inward radial movement of said ring.

14. A valve seat as defined in claim 1 wherein said sealing ring forms a pair of axially extending retaining shoulders on opposite sides thereof, and said groove means includes a corresponding pair of axially extending shoulders overlapping the shoulders on said sealing ring on the radially inward side thereof so as to block inward radial movement of said ring.

15. A valve seat as defined in claim 1 wherein said shoulder means is formed by a groove extending around the entire circumference of said sealing ring and extending axially through a major portion of the axial thickness of said sealing ring, said hoop means being inserted within said groove.

16. A valve seat as defined in claim 15 wherein the radial width of the groove in said ring is substantially greater than the radial thickness of said hoop means, said ring being dimensioned to permit fluid passage between the open end of said groove and one side of said closure member so as to expose said shoulder means and hoop to the fluid pressure on said one side of said closure member.

17. A valve seat as defined in claim 15 wherein said radially outer portion of said groove means is offset in the axial direction to one side of the groove means, and the adjacent radially outermost surface of the wider inner portion of said groove means is spaced away from the adjacent surface of said sealing ring, said ring being dimensioned to permit fluid passage from the other side of said closure member to the space between said outermost surface of the inner portion of said groove means and the adjacent surface of said sealing ring so as to expose said ring to the fluid pressure on said other side of said closure member.

* * * * *